US012649370B2

(12) United States Patent
Cao et al.

(10) Patent No.: US 12,649,370 B2
(45) Date of Patent: Jun. 9, 2026

(54) MOTOR VEHICLE

(71) Applicant: NANORAMIC, INC., Woburn, MA (US)

(72) Inventors: Wanjun Ben Cao, Boston, MA (US); Nicolo Brambilla, Brookline, MA (US)

(73) Assignee: NANORAMIC, INC., Woburn, MA (US)

( * ) Notice: Subject to any disclaimer, the term of this patent is extended or adjusted under 35 U.S.C. 154(b) by 856 days.

(21) Appl. No.: 17/366,527

(22) Filed: Jul. 2, 2021

(65) Prior Publication Data

US 2022/0001752 A1 Jan. 6, 2022

Related U.S. Application Data

(60) Provisional application No. 63/048,193, filed on Jul. 5, 2020.

(51) Int. Cl.

| | |
|---|---|
| ***B60L 15/20*** | (2006.01) |
| ***B60L 50/40*** | (2019.01) |
| ***B60L 50/60*** | (2019.01) |
| ***H01M 10/0525*** | (2010.01) |
| ***H01M 10/42*** | (2006.01) |

(52) U.S. Cl.

CPC ......... *B60L 15/20* (2013.01); *H01M 10/0525* (2013.01); *H01M 10/425* (2013.01); *B60L 50/40* (2019.02); *B60L 50/60* (2019.02); *B60L 2200/10* (2013.01); *B60L 2200/12* (2013.01); *B60L 2200/32* (2013.01); *H01M 2010/4271* (2013.01); *H01M 2220/20* (2013.01)

(58) Field of Classification Search

CPC .. B60L 15/20; B60L 2200/10; B60L 2200/12; B60L 2200/32; H01M 10/0525; H01M 10/425; H01M 2010/4271; H01M 2220/20

See application file for complete search history.

(56) References Cited

U.S. PATENT DOCUMENTS

| | | | | |
|---|---|---|---|---|
| 6,210,839 | B1 * | 4/2001 | Gan | H01M 6/168 429/330 |
| 9,001,495 | B2 | 4/2015 | Martini et al. | |
| 9,218,917 | B2 | 12/2015 | Brambilla et al. | |
| 10,600,582 | B1 | 3/2020 | Brambilla et al. | |
| 2005/0233219 | A1 * | 10/2005 | Gozdz | H01M 4/587 429/231.95 |
| 2011/0111279 | A1 * | 5/2011 | Smithyman | H01M 8/0243 428/221 |
| 2015/0188136 | A1 * | 7/2015 | Mori | H01M 4/525 429/223 |

(Continued)

FOREIGN PATENT DOCUMENTS

| | | | | |
|---|---|---|---|---|
| WO | 2016057983 A2 | | 4/2016 | |
| WO | WO-2019163483 A1 | * | 8/2019 | H01M 10/0525 |

(Continued)

*Primary Examiner* — Ula C Ruddock
*Assistant Examiner* — Olivia Mason Ruggiero

(57) ABSTRACT

Disclosed herein is a vehicle, comprising a drivetrain configured to provide the vehicle with propulsion; and a controller configured to obtain power from an energy source and to provide the drivetrain with power, wherein the controller regulates an amount of power provided to the drivetrain.

15 Claims, 14 Drawing Sheets

(56) References Cited

U.S. PATENT DOCUMENTS

| | | | | |
|---|---|---|---|---|
| 2016/0043387 | A1* | 2/2016 | Kalaiselvi ............. | H01M 4/505 429/223 |
| 2016/0372802 | A1* | 12/2016 | Chiang ................... | H01M 6/52 |
| 2017/0141368 | A1* | 5/2017 | Ricci ....................... | B60L 53/52 |
| 2019/0020033 | A1* | 1/2019 | Li ......................... | H01M 4/133 |

FOREIGN PATENT DOCUMENTS

| | | | | |
|---|---|---|---|---|
| WO | WO-2019216695 | A1 * | 11/2019 | ........ H01M 10/0525 |
| WO | 2021007183 | A1 | 1/2021 | |

* cited by examiner

400

| Component | Formula / Diagram | Amount |
|---|---|---|
| **Salt:**<br>Lithium bis(trifluoromethanesulfonyl)imide | 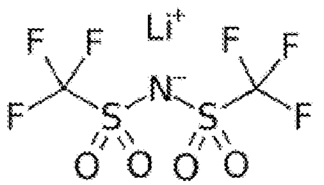 | [0.5 – 1.5] Mol/L |
| **First Solvent Compound:**<br>Butyl Nitrite |  | [60-90] vol % |
| **Second Solvent Compound:**<br>Gamma-Butyrolactone | 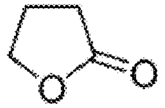 | [10-25] vol % |
| **Third Solvent Compound:**<br>Vinylene Carbonate | 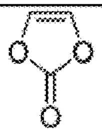 | [0-20] vol % |
| **Fourth Solvent Compound:**<br>4-[fluoro(dimethyl)silyl] butanenitrile | 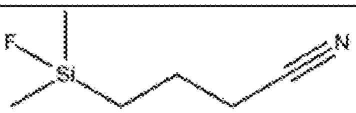 | [0-5] vol % |
| **Additive:**<br>[Li difluoro(oxalato)borate] | 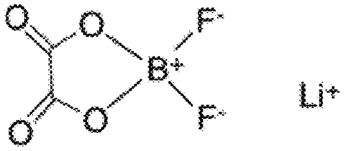 | [0.0-0.2] Mol/L |

FIG. 8

| SPECIFICATIONS | | | | | |
|---|---|---|---|---|---|
| **Test** | **Description** | **Min** | **Typ** | **Max** | **Units** |
| **Electrical** | | | | | |
| Rated Capacitance | Measured at 1C rate charge-discharge | 1000 | 1050 | 1100 | F |
| Operating Voltage | LIC cell charge-discharge voltage ranges | 2.2 | 3 | 3.8 | V |
| Series Resistance (ESR) | Measured at 50C rate charge-discharge | 2.5 | 2.8 | 3.1 | mΩ |
| Specific Energy | Measured at 1C rate charge-discharge | 13 | 13.5 | 14 | Wh/kg |
| Energy Density | Measured at 1C rate charge-discharge | 24 | 24.5 | 25 | Wh/L |
| Max. Specific Power | Calculated by ESR value and max. voltage and cell mass | 12 | 12.5 | 13 | kW/kg |
| Max. Power Density | Calculated by ESR value and max. voltage and cell volume | 23 | 23.5 | 24 | kW/L |
| Operating Temperature | This is the operational temperature range of the hybrid LIC energy storage device | -55 | 30 | 85 | °C |
| DC Life | Within 30% in ESR and 10% in capacitance change at 3.8V and 85 °C for 1000 hours. Within 100% in ESR and 20% in capacitance change at 3.8V and 85 °C for 2000 hours. | 1000 | 1500 | 2000 | hours |
| Cycle Life | High rate (50C or 100C) constant current charge-discharge | 50,000 | 100,000 | 200,000 | cycles |
| **Physical** | | | | | |
| Length | Cell core size not including tabs and sealing | 109 | 111 | 113 | mm |
| Width | Cell core size not including tabs and sealing | 61 | 63 | 65 | mm |
| Height | Cell core size not including tabs and sealing | 7.7 | 8.0 | 8.3 | mm |
| Tabs Width (thickness 0.2 mm) | | 39.5 | 40 | 40.5 | mm |
| Mass | | 100 | 103 | 106 | |

Cell Design

| | |
|---|---|
| Cell capacity (mAh) | 2000.0 |
| Number of cathode electrodes | 7 |
| N/P ratio | 1.2 |
| Balance at charge | 1.00 |
| Energy density (Wh/kg) | 373 |
| Energy density (Wh/L) | 728 |

Cathode formation

| | Material | Grade | Formulation | |
|---|---|---|---|---|
| Active material | NCM811 | - | 100 | 95.0 |
| | - | - | 0 | |
| | - | - | 0 | |
| Conductive Material | NX 3D Carbon | | | 5.0 |
| | SGP5 | SGP5 | | 0.0 |
| Binder | PVDF | Solef6020 | | 0.0 |
| | - | - | | 0 |
| Addtive | - | - | | 0 |
| total | | | | 100 |

| | 1st charge (mAh/g) | 1st discharge (mAh/g) | Efficiency (%) |
|---|---|---|---|
| Coin cell data | 228.0 | 210.0 | 92.1 |
| | 0.0 | 0.0 | - |
| | 0.0 | 0.0 | - |
| total | 228.0 | 210.0 | 92.1 |

FIG. 14

Anode formation

| | Material | Grade | Formulation | |
|---|---|---|---|---|
| Active material | AG | AG | 70 | 96 |
| | Si | Si | 30 | |
| | - | - | 0 | |
| Conductive Material | NX 3D Carbon | NX 3D Carbon | | 4.0 |
| | graphite | SGO-5 | | 0.0 |
| Binder | CMC | MAC350HC | - | 0.0 |
| | SBR | BM451B (40%) | - | 0 |
| Addtive | - | - | | 0 |
| total | | | | 100 |

| | 1st charge (mAh/g) | 1st discharge (mAh/g) | Efficiency (%) |
|---|---|---|---|
| Coin cell data | 360.0 | 330.0 | 91.7 |
| | 2000.0 | 1400.0 | 70.0 |
| total | 852.0 | 651.0 | 76.4 |

FIG. 15

Electrode

| | Cathode | Anode | Unit |
|---|---|---|---|
| Coating | 56.21 | 17.86 | mg/cm2 |
| | 0.00 | 0.00 | g/cc |
| Processing | 3.3 | 1.5 | g/cc |
| | 170.3 | 119.1 | um |

FIG. 16

MOTOR VEHICLE

CROSS REFERENCE TO RELATED APPLICATIONS

This application claims the benefit of U.S. Provisional Application Ser. No. 63/048,193, filed Jul. 5, 2020, the entire disclosure of which is incorporated herein by reference.

FIELD OF THE INVENTION

The invention disclosed herein relates to vehicles, and in particular to the management, generation, and distribution of among various components of a vehicle.

BACKGROUND OF THE INVENTION

Continuous development with respect to vehicles has lead to the incorporation of an increasing number of componentry and modules, which respectively use energy to operate. The componentry and modules of a vehicle that may require energy include (i) a heating, ventilation and air conditioning (HVAC) system, (ii) a various sensors that obtain information pertaining to ambient light, a distance or presence of objects within a certain distance of the vehicle, a status or operational information generated by other modules, etc., (iii) various motors that drive various modules of the vehicle, including a motor that controls a position of side mirrors, a motor that controls operation of windshield wipers, a motor that is used in the drive train, etc., (iv) user interfaces, including a various indicators or displays.

As the number of such componentry and modules increases, the circuitry, and power distribution throughout the vehicle is further complicated. Further, the increasing complexity and number of such componentry and modules gives rise to concerns regarding energy efficiency.

SUMMARY OF THE INVENTION

Generally, electrodes as disclosed herein incorporate a binder-free or binder-less network of carbon-based materials. Generally, the network includes high-aspect ratio materials that provide for entanglement of active material. Examples of the network are provided in U.S. Pat. No. 10,600,582, entitled "Composite Electrode," the entire contents of which is incorporated by reference for any purpose whatsoever.

Active material that may be useful in the electrode include examples disclosed in U.S. Provisional Patent Application No. 62/954,771, entitled "Electrodes for Energy Storage Devices," the entire contents of which is incorporated by reference for any purpose whatsoever.

Electrolyte as may be useful in energy storage devices fabricated using the technology disclosed herein include those disclosed in U.S. Provisional Patent Application No. 62/954,771, entitled "Electrodes for Energy Storage Devices," the entire contents of which is incorporated by reference for any purpose whatsoever.

Various embodiments include a vehicle comprising a drivetrain configured to provide the vehicle with propulsion, and a drivetrain configured to provide the vehicle with propulsion. The vehicle may include a user interface that provides information pertaining to a status of one or more of (i) a module of the vehicle, and (ii) the vehicle in relation to an environment. The vehicle may be one or more of an automobile, a scooter, a motorcycle, a bike, a watercraft, and a drone.

In some embodiments, the vehicle comprises an energy storage device. The energy storage device may include a housing, and the housing may comprise (i) an anode comprising a current collector comprising anode active material dispersed in a carbon network disposed thereon, the anode active material comprising $SiO_x$ material, (ii) an anode comprising a current collector comprising cathode active material dispersed in a carbon network disposed thereon, the cathode active material comprising nickel-rich layered oxide material such as $N_xM_yC_{1-x-y}$, where X>0.8 (NMC811) (e.g., $LiNi_{0.8}Mn_{0.1}Co_{0.1}O_2$), (iii) a separator disposed between the anode and the cathode, and (iv) an electrolyte wetting the anode, cathode and separator.

In some embodiments, the vehicle comprises an energy storage device. The energy storage device comprises a cathode that is substantially binder free. The cathode of the energy storage device may be free of polyvinylidene fluoride or polyvinylidene difluoride. The cathode of the energy storage device may be free of N-Methyl Pyrrolidone (NMP).

In some embodiments, the vehicle comprises an energy storage device. The energy storage device comprises an anode. The anode may comprise silicon oxide. In some embodiments, the anode is substantially binder-less.

In some embodiments, the vehicle comprises an energy storage device. The energy storage device may comprise a cathode. The cathode may comprise a current conductor, an adhesion layer, and an active layer. The adhesion layer may cause the active layer to adhere to the current conductor. The adhesion layer may comprise a quantity of high aspect ratio carbon, and active material disposed within the quantity of high aspect ratio carbon. In some embodiments, the high aspect ratio carbon comprises a network of parts of carbon, at least a part of the network forming an entanglement with respect to the active material to cause the active material to adhere to the cathode. The cathode may be substantially free of a polymeric binding agent.

In some embodiments, the cathode comprises high aspect ratio carbon and active material, and an entanglement of the active material within the high aspect ratio carbon causes the active material to adhere to the cathode.

In some embodiments, the high aspect ratio carbon comprised in the cathode comprises a carbon network, and the carbon network comprises a set of longer high aspect ratio nanocarbons, and a set of shorter high aspect ratio nanocarbons. The set of longer high aspect ratio nanocarbons provides a scaffold for the cathode network, and the set of shorter high aspect ratio nanocarbons provides ties within the cathode network.

In some embodiments, the cathode comprises high aspect ratio carbon. The high aspect ratio carbon comprised in the cathode comprises a carbon network, and the carbon network is at least ninety nine percent carbon by weight.

In some embodiments, the vehicle comprises an energy storage device. The energy storage device comprises a cathode. The cathode of the energy storage device may exhibit a ratio of an amount of discharge on a first discharge to an amount of charge on a first charge that is at least ninety-two percent.

In some embodiments, the vehicle comprises an energy storage device. The energy storage device comprises an anode. The anode of the energy storage device may exhibit a ratio of an amount of discharge on a first discharge to an amount of charge on a first charge that is at least ninety-one percent.

In some embodiments, the vehicle comprises an energy storage device. The energy device may comprise a first electrode, a second electrode, and a permeable separator disposed between the first electrode and the second electrode; and an electrolyte wetting the first and second electrodes. At least one of the first electrode or the second electrode may comprise a current collector; upon which is disposed an electrode active layer. The electrode active layer may comprise a current collector; upon which is disposed an electrode active layer. The electrode active layer may comprise a network of high aspect ratio carbon elements defining void spaces within the network, a plurality of electrode active material particles disposed in the void spaces within the network and enmeshed in the network, and a surface treatment on a surface of the high aspect ratio carbon elements which promotes adhesion between the high aspect ratio carbon elements and the active material particles. The surface treatment material may comprise a surfactant. The active material particles may comprise lithium metal oxides.

Various embodiments include an energy storage device. The energy device may comprise a first electrode, a second electrode, and a permeable separator disposed between the first electrode and the second electrode; and an electrolyte wetting the first and second electrodes. At least one of the first electrode or the second electrode may comprise a current collector; upon which is disposed an electrode active layer. The electrode active layer may comprise a current collector; upon which is disposed an electrode active layer. The electrode active layer may comprise a network of high aspect ratio carbon elements defining void spaces within the network, a plurality of electrode active material particles disposed in the void spaces within the network and enmeshed in the network, and a surface treatment on a surface of the high aspect ratio carbon elements which promotes adhesion between the high aspect ratio carbon elements and the active material particles.

In some embodiments, at least one of the first electrode or the second electrode of the energy storage device is substantially binder free.

In some embodiments, the network of high aspect ratio carbon elements comprised in the energy storage device comprises at least ninety-nine percent carbon by weight.

In some embodiments, one of the first electrode or the second electrode of the energy storage device corresponds to a cathode, and the cathode of the energy storage device is free of polyvinylidene fluoride or polyvinylidene difluoride cathode of the energy storage device is free of polyvinylidene fluoride or polyvinylidene difluoride.

In some embodiments, an energy storage device comprises a first electrode and a second electrode, and the first electrode exhibits a ratio of an amount of discharge on a first discharge to an amount of charge on a first charge that is at least ninety-two percent, and the second electrode exhibits a ratio of an amount of discharge on a first discharge to an amount of charge on a first charge that is at least ninety-one percent.

BRIEF DESCRIPTION OF THE DRAWINGS

The features and advantages of the invention are apparent from the following description taken in conjunction with the accompanying drawings in which:

FIG. 8 through FIG. 11 are diagrams depicting aspects of electrolyte useful for fabrication of an energy storage cell according to various embodiments of the present application.

FIG. 12 is a schematic illustration of an arrangement of electrodes of an energy storage device according to various embodiments of the present application, and FIGS. 13 through 16 are data tables providing information pertaining embodiments of the present application.

DETAILED DESCRIPTION OF THE INVENTION

Figure 1:
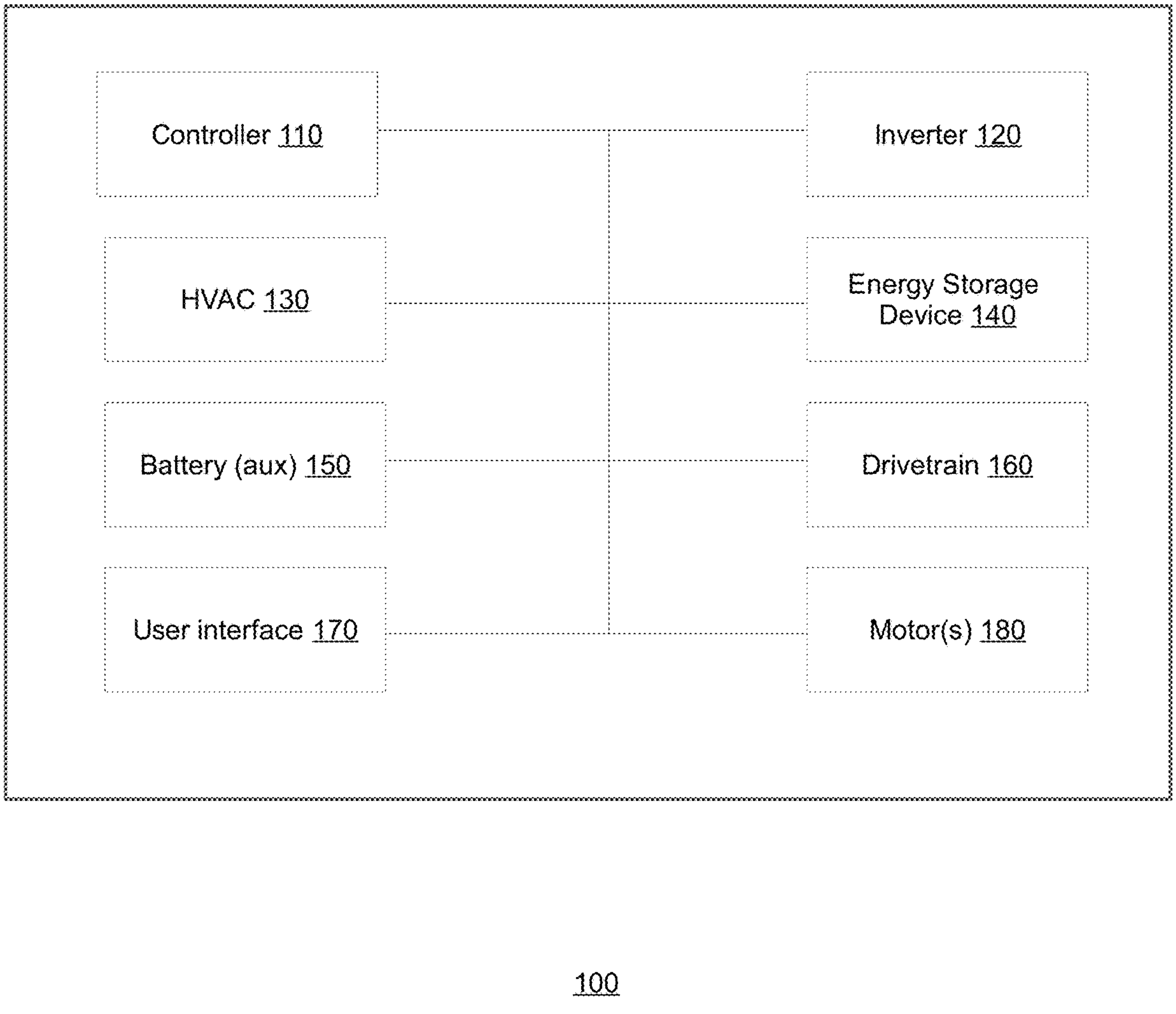
FIG. 1 is a block diagram of a vehicle according to various embodiments of the present application.

Various embodiments comprise a vehicle that includes one or more components driven by electricity. The vehicle may comprise a controller that obtains electricity and regulates the electrical energy distributed to at least one of the one or more components. The vehicle may comprise an inverter that obtains electricity from the controller and provides electricity to the one or more components.

As used herein, “vehicle” may include an automobile, a truck, a scooter, an electric bike, a skateboard, a drone, a motorcycle, a watercraft, a plane, a helicopter, etc.

Electrodes used in energy storage devices (ESDs) include compositions of active material and a binder disposed on a current collector. The active material stores energy and the binder provides physical integrity for the active material and adhesion to the current collector. Unfortunately, materials useful as binders detract from the electrical performance of the active material. The use of certain binders is particularly challenging in some battery chemistries, such as those employing lithium in the active material.

Various embodiments comprise methods and apparatuses that provide for cohesion of active material and adhesion of the active material to a current collector.

Various embodiments include an energy storage device (ESD) that comprises one or more binder free electrodes (e.g., a cathode and/or an anode). In some embodiments, the ESD is comprised in a vehicle. The ESD may provide power (e.g., electricity) to one or more modules of the vehicle. As an example, the ESD may provide power to a drivetrain of the vehicle. The ESD may be a battery, an ultracapacitor, or any other similar type of device making use of electrodes for energy storage.

Various embodiments include methods and apparatus for providing a li-ion battery energy storage cell that include a PVDF polymer binder-free and NMP-free cathode and binder-free $SiO_x$ anode electrodes. The energy storage cell may be provided as a pouch cell or take other forms as deemed appropriate. In some embodiments, the energy storage cell is comprised in an ESD such as an ESD comprised in a vehicle.

Generally, application of the ESD, the energy storage, and/or the technology disclosed herein can result in energy storage devices capable of delivering high power, high energy, exhibiting a long lifetime and operating over a wide range of environmental conditions. The technology disclosed is deployable in high-volume manufacturing for a variety of energy storage devices and in a variety of forms. Advantageously, the techniques result in lower costs for fabrication of energy storage devices.

As discussed herein, the term "energy storage device" (also referred to as an "ESD") generally refers to an electrochemical cell. An electrochemical cell is a device capable of either generating electrical energy from chemical reactions or using electrical energy to cause chemical reactions. Electrochemical cells which generate electric current are referred to as "voltaic cells" or "galvanic cells," and those that generate chemical reactions, via electrolysis for example, are called electrolytic cells. A common example of a galvanic cell is a standard 1.5 volt cell designated for consumer use. A battery comprises one or more cells, connected in parallel, series or series-and-parallel pattern. A secondary cell, commonly referred to as a rechargeable battery, is an electrochemical cell that can be run as both a galvanic cell and as an electrolytic cell. This is used as a convenient way to store electricity, when current flows one way, the levels of one or more chemicals build up (e.g., while charging). Conversely, the chemicals reduce while the cell is discharging and the resulting electromotive force may be used to do work. One example of a rechargeable battery is a lithium-ion battery, some embodiments of which are discussed herein.

As used herein, an "anode" or a "cathode" refers to electrode in an electrochemical cell. The anode is the electrode at which electrons leave the electrochemical cell and oxidation occurs (e.g., indicated by a minus symbol, "−"), and the cathode is the electrode at which electrons enter the cell and reduction occurs (e.g., indicated by a plus symbol, "+"). In some embodiments, an electrode may become either the anode or the cathode depending on the direction of current through the cell. Given the variety of configurations and states for ESDs generally, the foregoing convention is not limiting of the teachings herein and use of such terminology is merely for purposes of introducing the technology. Accordingly, it should be recognized that the terms "cathode," "anode" and "electrode" are interchangeable in at least some instances. For example, aspects of the techniques for a fabrication of an active layer in an electrode may apply equally to anodes and cathodes. More specifically, the chemistry and/or electrical configuration discussed in any specific example may inform use of a particular electrode as one of the anode or cathode.

Generally, examples of ESDs disclosed herein are illustrative. For example, the ESD is not limited to the embodiments disclosed herein. An electrode disclosed herein may be used with various other ESDs.

According to various embodiments, ESDs include supercapacitors such as double-layer capacitors (e.g., devices storing charge electrostatically), psuedocapacitors (e.g., which store charge electrochemically) and hybrid capacitors (e.g., which store charge electrostatically and electrochemically). Generally, electrostatic double-layer capacitors (EDLCs) use carbon electrodes or derivatives with much higher electrostatic double-layer capacitance than electrochemical pseudocapacitance, achieving separation of charge in a Helmholtz double layer at the interface between the surface of a conductive electrode and an electrolyte. Generally, electrochemical pseudocapacitors use metal oxide or conducting polymer electrodes with a relatively high amount of electrochemical pseudocapacitance additional to the double-layer capacitance. Pseudocapacitance is achieved by Faradaic electron charge-transfer with redox reactions, intercalation or electrosorption. Hybrid capacitors, such as the lithium-ion capacitor, use electrodes with differing characteristics: one exhibiting mostly electrostatic capacitance and the other mostly electrochemical capacitance.

According to various embodiments, other examples of ESDs include rechargeable batteries, storage batteries, or secondary cells which are a type of electrical battery that can be charged, discharged into a load, and recharged many times. During charging, the positive active material is oxidized, producing electrons, and the negative material is reduced, consuming electrons. These electrons constitute the current flow from the external circuit. Generally, the electrolyte serves as a buffer for internal ion flow between the electrodes (e.g., anode and cathode). Battery charging and discharging rates are often discussed by referencing a "C" rate of current. The C rate is that which would theoretically fully charge or discharge the battery in one hour. "Depth of discharge" (DOD) is normally stated as a percentage of the nominal ampere-hour capacity. For example, zero percent (0%) DOD means no discharge.

FIG. 1 is a block diagram of a vehicle according to various embodiments of the present application.

Referring to FIG. 1, vehicle 100 is provided. Vehicle 100 may implement at least in part ESD 200 of FIG. 2, storage cell 300 of FIG. 3, ESD 400 of FIGS. 4A-4C, and/or electrode 500 of FIG. 5. As illustrated in FIG. 1, vehicle 100 may comprise one or more of controller 110, inverter 120, HVAC 130, ESD 140, battery 150, drivetrain 160, user interface 170, and motor 180. In some embodiments, ESD 140 at least partly implements ESD 200 of FIG. 2, storage cell 300 of FIG. 3, ESD 400 of FIGS. 4A-4C, and/or electrode 500 of FIG. 5.

Controller 110 may obtain power (e.g., electricity) from one or more power sources and provide the power to inverter 120. In some embodiments, controller 110 obtains the power from ESD 140. Controller 110 may comprise one or more processors. Controller 110 may regulate electricity obtained by a power source (e.g., ESD 140 and/or battery 150), which controller 110 may provide to inverter 120. In some embodiments, controller 110 determines an amount of power to provide to inverter 110 based at least in part on a user input or an instruction generated by a driving module (e.g., a module that is configured to autonomously or semi-autonomously control or drive vehicle 100). The user input may correspond to an input to a pedal in vehicle 100. Controller 110 manages the flow of electrical energy delivered by, for example, ESD 140. As an example, controller 110 controls the speed of the electric traction motor and the torque it produces.

Inverter 120 may be configured to convert power from a direct current (DC) to an alternating current (AC). The electricity provided to vehicle 100 by, for example, ESD 140 may be in DC and motor(s) 180 and/or drive train 160 may be configured to use AC current. In some embodiments, vehicle 100 comprises a regenerative braking module to recapture energy generated by braking and slowing/stopping vehicle 100. Inverter 120 may be used to convert AC current that is obtained during the braking/slowing of vehicle 100 to DC current for storage in ESD 140 and/or battery 150.

HVAC 130 may control a temperature or a heating/cooling system of vehicle 100. HVAC may control vehicle 100 to maintain a range of temperatures within which various modules of vehicle 100 operate (e.g., motor 180, drivetrain 160, battery 150, ESD 140, etc.).

ESD 140 may be configured to store energy. ESD 140 may provide the energy (e.g., current) to controller 110 and/or inverter 120 in connection with providing power to drivetrain 160 to drive vehicle 100. In some embodiments, ESD 140 is a primary source of power/energy within vehicle 100. As an example, vehicle 100 may comprise a charging module that may be connected to an external power supply to charge/re-charge ESD 140.

Battery 150 may be configured to store energy. In some embodiments, battery 150 may be an auxiliary power source for vehicle 100. For example, battery 150 may be used in connection with providing power to accessories such as internal lights, user interface 170 (e.g., a dashboard interface/computer), etc.

Drivetrain 160 may be configured to provide propulsion to vehicle 100. In embodiments, drivetrain 160 converts current provided to drivetrain 160 (e.g., from inverter 120) to propulsion. For example, drivetrain 160 may comprise a motor such as a brushless DC motor. Drive 160 may use the AC current to cause the motor to turn a transmission and/or wheels of vehicle 100.

User interface 170 may be configured to provide information pertaining to vehicle 100 to a user and/or to receive one or more user inputs. User interface 170 may comprise a display and/or a processor. For example, user interface 170 may comprise a touchscreen, etc. The information pertaining to vehicle 100 may comprise information indicating a status of vehicle 100 (e.g., a status of one or more modules in vehicle 100, such as an indication of whether a module is functioning according to normal operation), etc. In some embodiments, the information pertaining to vehicle 100 comprises a speed of vehicle, a direction of vehicle, etc.

Motor(s) 180 may be configured to control one or more components of vehicle 100. For example, motor(s) 180 may comprise one or more motors that control side mirrors of vehicle 100, a front windshield wiper, a rear windshield wiper, etc. Motor(s) 180 may obtain power from inverter 120 (e.g., ESD 140) and/or battery 150.

Figure 2:
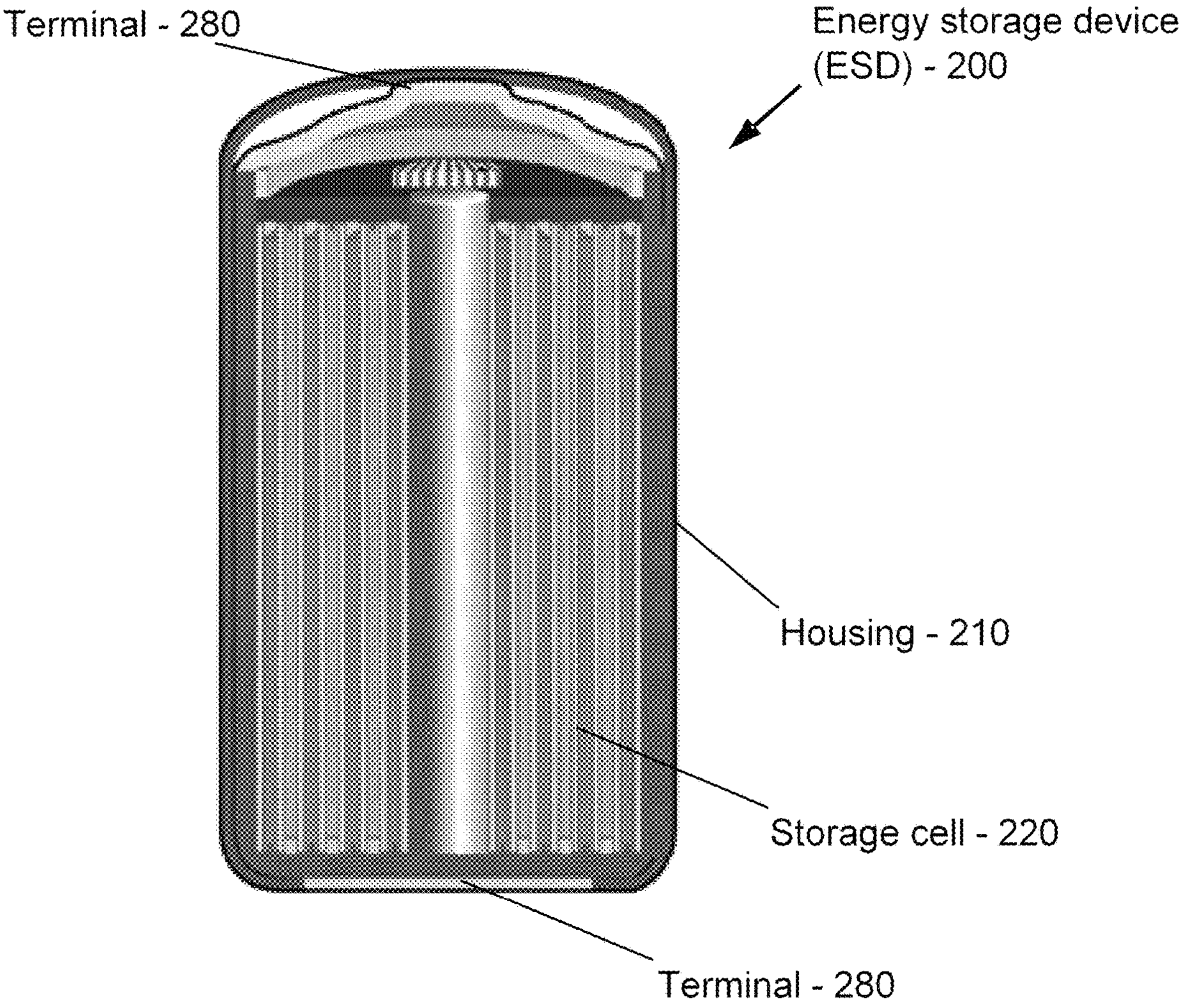
FIG. 2 is a schematic cutaway diagram depicting aspects of an energy storage device (ESD).

FIG. 2 is a schematic cutaway diagram depicting aspects of an energy storage device (ESD). Referring to FIG. 2, ESD 200 may implement at least part of vehicle 100 of FIG. 1. In some embodiments, ESD 200 provides power to vehicle 100 to power drivetrain 160 of vehicle 100.

In FIG. 2, a cross section of an energy storage device (ESD) 200 is shown. ESD 200 includes a housing 210. The housing 210 has two terminals 280 disposed on an exterior thereof. The terminals 280 provide for internal electrical connection to a storage cell 220 comprised within the housing 11 and for external electrical connection to an external device such as a load or charging device (not shown).

Figure 3:
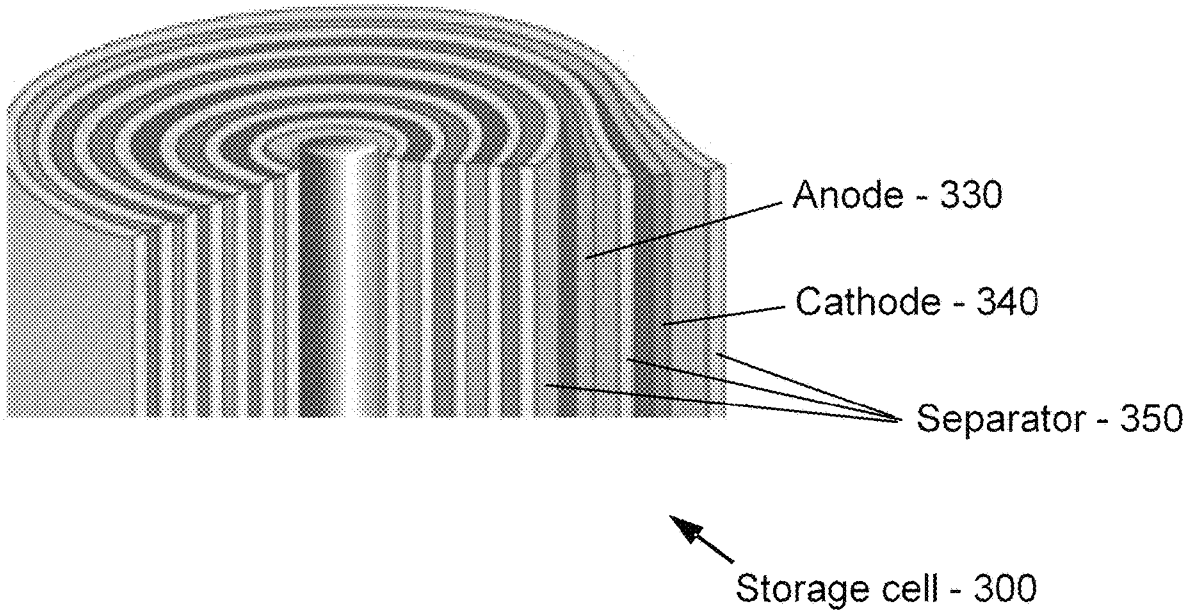
FIG. 3 is a schematic cutaway diagram depicting aspects of a storage cell of ESD such as ESD of FIG. 2.

FIG. 3 is a schematic cutaway diagram depicting aspects of a storage cell of ESD such as ESD of FIG. 3. Referring to FIG. 3, storage cell 300 may implement at least part of vehicle 100 of FIG. 1. In some embodiments, storage cell 300 provides power to vehicle 100 to power drivetrain 160 of vehicle 100.

As illustrated in FIG. 3, a cutaway portion of an ESD such as storage cell 220 of FIG. 2 is provided. Storage cell 300 may include a multi-layer roll of energy storage materials. For example, sheets or strips of energy storage materials are rolled together into a roll format. The roll of energy storage materials include opposing electrodes referred to as an "anode 330" and as a "cathode 340." The anode 330 and the cathode 340 are separated by a separator 350. Not shown in the illustration but included as a part of the storage cell 300 is an electrolyte. Generally, the electrolyte permeates or wets the cathode 340 and the anode 340 and facilitates migration of ions within the storage cell 300. Ionic transport is illustrated conceptually in FIG. 4.

Figure 4A:
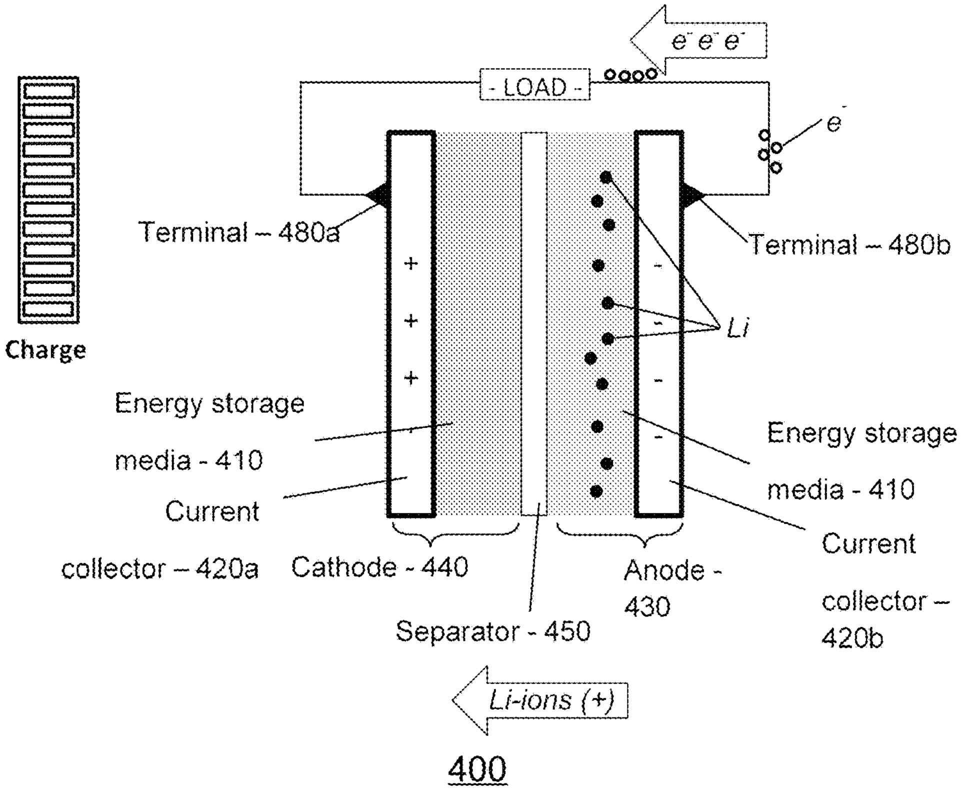
FIGS. 4A, 4B and 4C, collectively referred to herein as FIG. 4, are schematic diagrams depicting aspects of ionic transport between electrodes in a storage cell such as storage cell of FIG. 3.
Figure 4B:
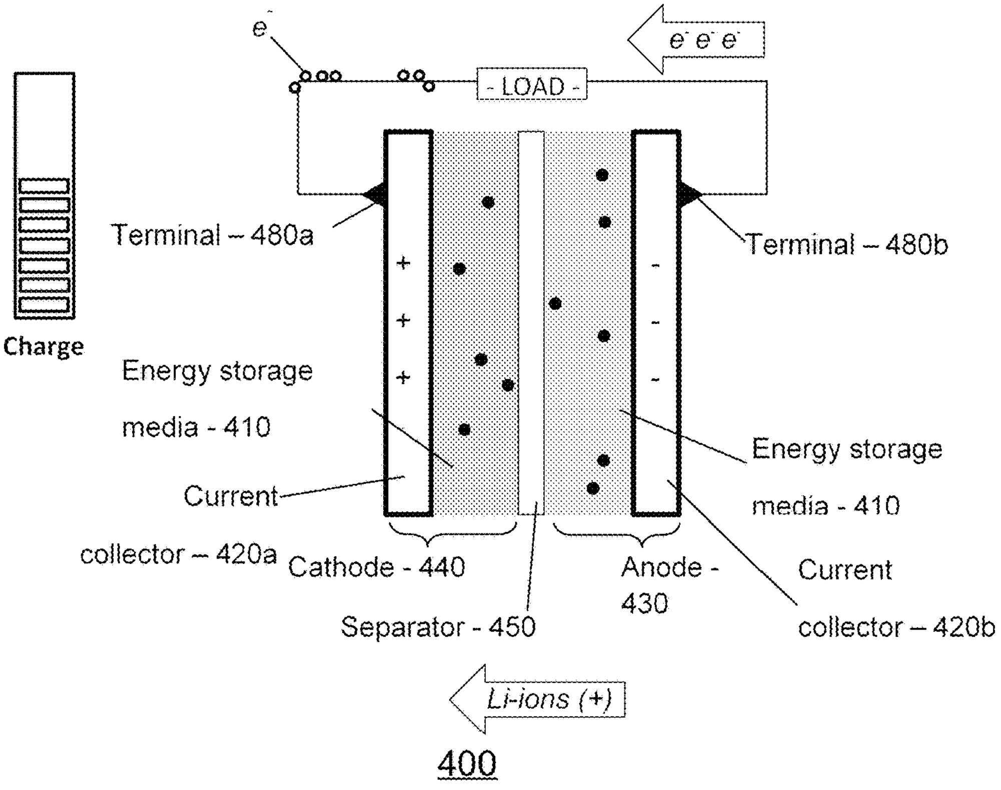
Figure 4C:
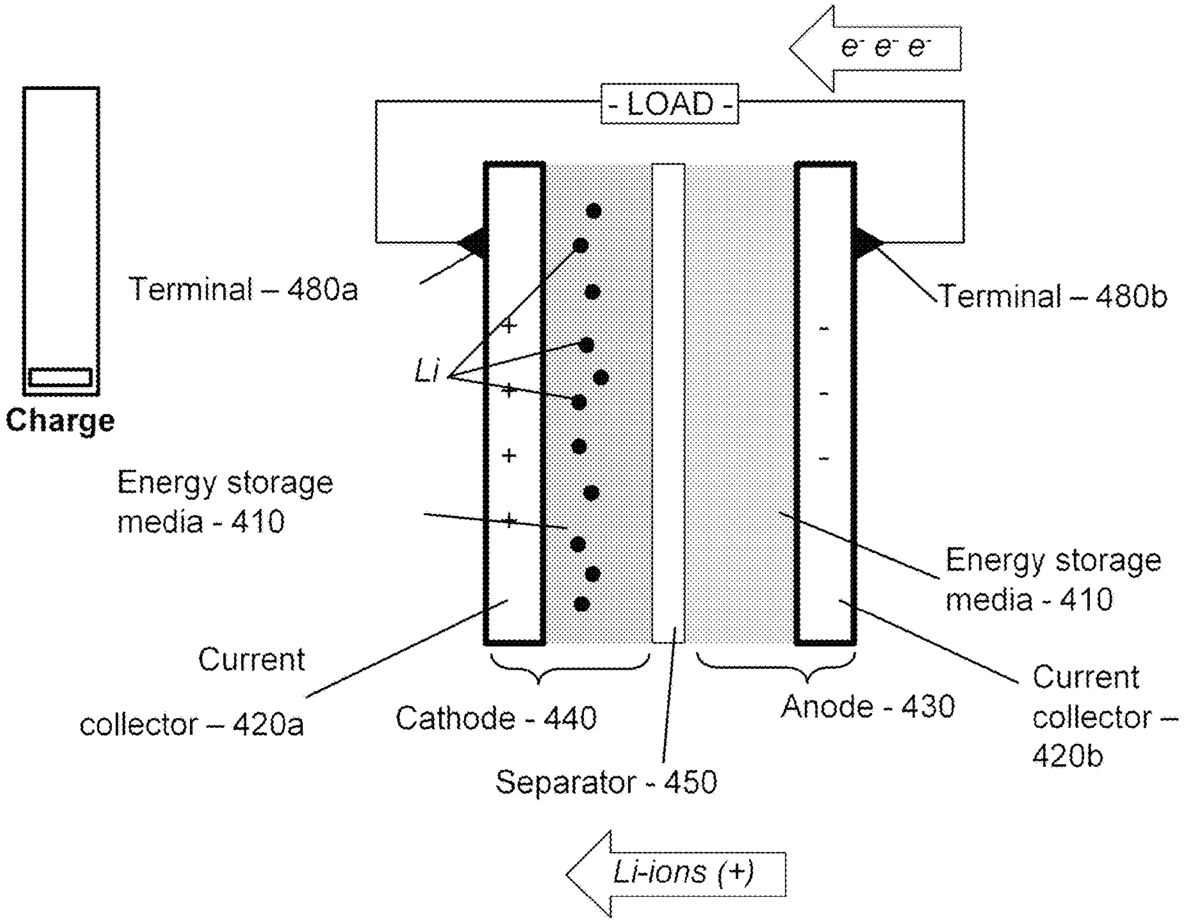

FIGS. 4A, 4B and 4C, collectively referred to herein as FIG. 4, are schematic diagrams depicting aspects of ionic transport between electrodes in a storage cell such as storage cell of FIG. 3.

As illustrated in FIG. 4, a discharge sequence is shown for ESD 400 is shown. In some embodiments, ESD 400 is a lithium-ion battery. ESD 400 comprises anode 430, the cathode 440, the separator 450, and electrolyte 460. Further description of various elements of ESD 400 is provided below. In some embodiments, anode 430 and cathode 440 store lithium.

Referring to FIG. 4A, aspects of ESD 400 is provided. For example, a fully charged ESD are shown. In this illustration, the anode 430 contains energy storage media 410 disposed on a current collector 420*b*. The energy storage media 410 of the anode 430 for a fully charged energy ESD substantially contains all of the lithium within the storage cell. Similar in construction, the cathode 440 contains energy storage media 410 disposed on a current collector 430*a*.

As a load (for example, a cell phone, computer, a vehicle, etc., not shown) is connected to and draws energy from ESD 400, electrons ($e^-$) are drawn from the anode 430. Positively charged lithium ions migrate within the storage cell 420 to the cathode 440. This causes depletion of charge as shown in the charge-meter depicted in FIG. 4B. When ESD 400 is fully depleted, substantially all of the lithium ions have migrated to the cathode 440, as shown in FIG. 4C.

Swapping a charging device for the load and energizing the charging device causes flow of electrons ($e^-$) to the anode 430 and the attendant migration of the lithium ions from the cathode 440 to the anode 430. Whether discharging or charging, the separator 450 blocks the flow of electrons within ESD 400.

In a typical lithium-ion battery, the anode 430 may be made substantially from a carbon based matrix with lithium intercalated into the carbon based matrix. In related art, the carbon based matrix generally includes a mixture of graphite and binder material. In related art, the cathode 440 often includes a lithium metal oxide based material along with a binder material.

Figure 5:
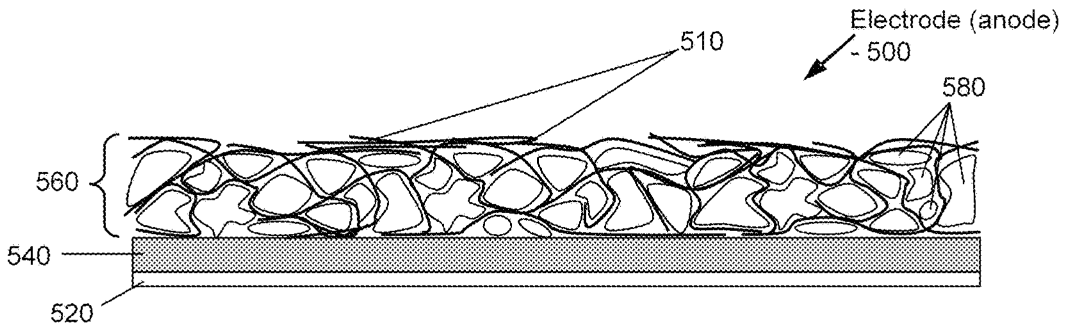
FIG. 5 is a schematic diagram depicting aspects of an electrode for an ESD according to various embodiments of the present application.

FIG. 5 is a schematic diagram depicting aspects of an electrode for an ESD according to various embodiments of the present application. Referring to FIG. 5, electrode 500 may be implemented as at least part of vehicle 100 of FIG. 1, such as in ESD 140 of vehicle 100.

As illustrated in FIG. 5, an example of an electrode 500 is shown. In this example, the electrode 500 is an embodiment of an anode of an ESD. Electrode 500 (e.g., anode) includes a current collector 520. An optional adhesion layer 540 may be disposed on current collector 520. In some embodiments, an active layer 560 is disposed on adhesion layer 540. In some embodiments, active layer 560 is disposed directly on current collector 520. According to various embodiments, the active layer 560 includes a network of high aspect ratio nanocarbons. The network of high aspect ratio nanocarbons is generally referred to herein as a "carbon network 510" and by other similar terminology. The carbon network 510 may serve to trap and retain active materials 580. According to various embodiments, incorporation of high aspect ratio carbon nanomaterials in the carbon network 510 results in entanglement of the carbon nanomaterials and the active materials 580 added to the active layer 560.

According to various embodiments, active layer 560 may be fabricated substantially without a binder material based at least in part on controlling configuration of the carbon network 510. In some embodiments, active layer 560 does not comprise binder material. For example, by controlling the carbon nanomaterials used (e.g., in connection with fabricating/configuring active layer 560 or electrode 500), the resulting entanglement (and other forces such as electrostatic attraction and Van derWaals forces) can be configured for improved electrical and physical performance of the active layer 560 and the electrode 500 overall.

According to various embodiment, at least in part because the active layer 560 does not contain inert binder materials, electrode 500 exhibits performance characteristics superior to anodes or active layers in electrodes of related art. Electrodes (e.g., anodes) according to the related art generally include a binder material a polyvinylidene fluoride or polyvinylidene difluoride (PVDF). PVDF is a highly non-reactive thermoplastic fluoropolymer produced by the polymerization of vinylidene difluoride. PVDF is often used with a toxic solvent such as N-methyl pyrrolidone (NMP). Other binders that may be used include, but are not limited to, polyethylene (PE), high molecular weight polyethylene (HMWPE), ultra-high molecular weight polyethylene (UHMWPE), polypropylene (PP), carboxymethyl cellulose (CMC), polyvinylphenol, polyvinylpyrrolidine, polyvinyl acetate, polyvinyl alcohol, and polyacetylene. Generally, the term "binder" as used herein is with reference to polymers, co-polymers, and similar ultra-high molecular weight substances or other materials capable of providing a binding for the active materials such as those disclosed herein. Such substances are often employed for promoting cohesion in loosely-assembled particulate materials and are typically otherwise inert. For example, typical binder materials of the prior art do not exhibit substantially any useful properties for energy storage or conductance and are therefore considered inert with respect to energy storage functions.

In some embodiments, electrode 500 is two-sided electrode. For example, in some embodiments, electrode 500 contains the optional adhesion layer 540 and the active layer 560 disposed on opposing planar sides of the current collector 520. A one-sided electrode is depicted in the illustration of FIG. 5.

In some embodiments, the adhesion layer 540 is omitted. The adhesion layer 540 may be omitted, for example, in cases where the active layer 560 exhibits good adhesion directly with the current conductor 520 (also referred to as the "conductive layer" 520).

According to various embodiments, the current collector 520 collects charge and conducts the charge to the terminals of the ESD (e.g., terminals 280 of ESD 200 of FIG. 2). The adhesion layer 540 may primarily serve to cause adherence of the active layer 560 to the current conductor 520. In various embodiments, the adhesion layer 540 is configured as an intermediate layer that provides strong adhesion to the current conductor 520 and also to the active layer 560. In some embodiments, the adhesion layer 540 may also provide for at least some energy storage and may include similar fabrication techniques. In some embodiments, as the adhesion layer 540 and the active layer 560 serve differing roles in the construction of an electrode 500, each layer may differ with respect to physical aspects/properties. According to various embodiments, the active layer 560 is the dominant energy storage within the electrode 500.

In various embodiments, the current collector 520 (which may also be referred to as a "conductive layer" and by other similar terms) may be made of a suitable electrically conductive material such as a metal foil (e.g., an aluminum foil or copper foil). In some embodiments, the surface of the current collector 520 may be roughened, patterned, or otherwise texturized, e.g., to promote adhesion of the adhesion layer 540 (or active layer 560 such as in implementations according to which the adhesion layer 540 is omitted). Generally, the current collector 520 provides for good electrical conductance from the active layer 560. In some embodiments, the current collector 520 may be etched (e.g., mechanically or chemically). In some embodiments, the current collector 520 may have a thickness in the range of 1 micrometer (μm) to 100 micrometers (μm) or any subrange thereof. For example, the current collector 520 may have a thickness in a range of between about 5 μm to 40 μm. In some embodiments that conductive layer is not roughened or patterned and is characterized by a smooth finish.

Examples of suitable materials for the current collector 42 include aluminum, copper, nickel and alloys thereof. The current collector 42 maybe fabricated from rolled copper alloy foils, aluminum, copper and copper alloy foils as are commercially available.

In some embodiments, the current collector 520 includes surface treatment to improve aspects such as adherence and conductivity. For example, in some embodiments, the current collector 520 may include a nanostructured surface. For example, as described in International Pub. No. WO/2016/057983 entitled "Nanostructured Electrode for Energy Storage Device" published Jun. 30, 2016, the entirety of which is hereby incorporated herein for all purposes, the current collector 520 may have a top surface that includes nanoscale features such as whiskers (e.g., carbide whiskers) that promote adhesion with the adhesion layer 540 and good electrical conductance from the active layer 560.

According to various embodiments, a separator is disposed between an anode and a cathode of ESD. The separator (e.g., separator 450 of FIG. 4) may be a porous member disposed between the anode and the cathode. The separator ensures the electrodes (e.g., the anode 430 and the cathode 440) do not come in direct contact with each other, thus preventing current flow directly between the electrodes. At the same time, the separator allows ionic transport between the electrodes and by the electrolyte (e.g., energy media storage 410 of ESD).

According to various embodiments, the separator is a thin structural material (usually a sheet) used to separate the anode from the cathode. The separator may also serve to separate pairs of electrodes. The separator may be fabricated from various materials. In some embodiments, the separator is non-woven glass. The separator may also be fabricated from various forms of at least one of paper, fiberglass, ceramic and polymer materials. In one example, flouropolymeric material such as polytetrafluoroethylene (PTFE), commonly marketed as TEFLON™ by DuPont Chemicals of Wilmington, Del. is used. In another example, using non-woven glass, the separator includes main fibers and binder fibers each having a fiber diameter smaller than that of each of the main fibers and allowing the main fibers to be bonded together.

Some embodiments of materials for use in the separator include polyamide, polytetrafluoroethylene (PTFE), polypropylene (PP), polyetheretherketone (PEEK), aluminum oxide ($Al_2O_3$), fiberglass, glass-reinforced plastic (GRP), paper, cellulose, ceramic, combinations thereof as well as other materials.

In general, materials used for the separator may be chosen according to moisture content, porosity, melting point, impurity content, resulting electrical performance, thickness, cost, availability and the like. In some embodiments, the separator is formed of hydrophobic materials. Accordingly, procedures may be employed to ensure excess moisture is eliminated from each separator. Among other techniques, a vacuum drying procedure may be used.

According to various embodiments, aspects of the active layer 560 and the adhesion layer 540 may be configured over wide ranges of parameters. For example, components of the composition, thickness and manufacturing techniques for each of the active layer 560 and the adhesion layer 540 may be varied.

According to various embodiments, each of the active layer 560 and the adhesion layer 540 may comprise a quantity of high aspect ratio carbon with active material disposed therein. Generally, the term "high aspect ratio carbon" refers to forms of carbon that exhibit a substantial length in comparison to width thereof. Exemplary forms of carbon may include, for example, at least one of carbon fibers, rayon, graphene, aerogel, carbon nanotubes (CNT) and the like.

In some embodiments, the active layer (e.g., active layer 560 of FIG. 5) may be thicker than the adhesion layer (e.g., adhesion layer 540 of FIG. 5). For example, the active layer 560 may be 1.5, 2.0, 5.0, 10, 20, 30, 40, 50, 60, 70, 80, 90, 100, 500, 1,000 or more times the thickness of the adhesion layer 540. For example, in some embodiments, the thickness of the active layer 560 may be in the range of 1.5 to 1,000 times the thickness of the adhesion layer 540 (or any subrange thereof, such as 5 times to 100 times). In some embodiments, the active layer 560 may have a thickness in the range of 0.5 micrometers (μm) to 2500 micrometers (μm) or any subrange thereof, (e.g., 5 micrometers (μm) to 150 micrometers (μm)). In some embodiments, the adhesion layer 540 may have a thickness in the range of 0.5 micrometers (μm) to 50 micrometers (μm) or any subrange thereof (e.g., 1 micrometers (μm) to 5 micrometers (μm)).

In some embodiments, a single layer is provided in place of the combination adhesion layer 540 and active layer 560 described herein. Embodiments making use of a single layer may, for example, contain suitable mixtures of the materials set forth herein. More specifically, and as an example, in single layer or "unified" layer embodiments, a suitable mixture of functionalized carbon materials with energy storage materials may provide for both adhesion and energy storage.

According to various embodiments, the active layer 560 and the adhesion layer 540 are substantially free of polymeric binding agents. For example, in some embodiments, the active layer 560 and the adhesion layer 540 are substantially free of inert, non-conductive or low conductivity polymeric materials as are generally added to the energy storage media to provide or enhance physical integrity. According to various embodiments, cohesion and adhesion of materials in the active layer 560 are provided by entanglement of the high aspect ratio nanocarbon materials used, along with chemical bonding such as hydrogen bonds and covalent bonds between the surface functional groups of the carbons and the surface of the active materials. As discussed herein, a binding agent will survive the fabrication process and reside in the energy storage media throughout the operational life of the energy storage cell. In some embodiments, binding agents include high molecular weight polymeric materials.

In some other embodiments, some materials may be useful for providing a binding function while fabricating electrodes while subsequently being converted to carbon during assembly and thus becoming additional carbonaceous material within the energy storage media. Processes for conversion of such "assembly agents" include pyrolysis, among others. One example of an assembly agent is polyacrylonitrile (PAN).

Polyacrylonitrile (PAN), also known as "polyvinyl cyanide," is a synthetic, semicrystalline organic polymer resin, with the linear formula $(C_3H_3N)_n$. Almost all PAN resins are copolymers made from mixtures of monomers with acrylonitrile as the main monomer. PAN is a versatile polymer used to produce large variety of products including membranes, hollow fibers, and solid fibers. PAN fibers are the chemical precursor of high-quality carbon fiber. PAN is first thermally oxidized in air at 230 degrees Celsius to form an oxidized PAN fiber and then carbonized above 1000 degrees Celsius in inert atmosphere to make carbon fibers.

Additional examples of assembly agents include polyvinylpyrrolidone (PVP), also commonly called polyvidone or povidone, a water-soluble polymer made from the monomer N-vinylpyrrolidone as well as polyvinyl acetate (PVA). Polyvinyl acetate (PVA, PVAc, poly(ethenyl ethanoate) is commonly known as wood glue, white glue, carpenter's glue, school glue, and is an aliphatic rubbery synthetic polymer with the formula $(C_4H_6O_2)_n$.

Generally, the adhesion layer and the active layer include the carbon network. As introduced above with regard to FIG. 5, the carbon network 510 includes a network of high aspect ratio nanocarbons. In some embodiments, adhesion later and active layer include the carbon network 510. This is shown in greater detail in FIG. 6.

Figure 6:
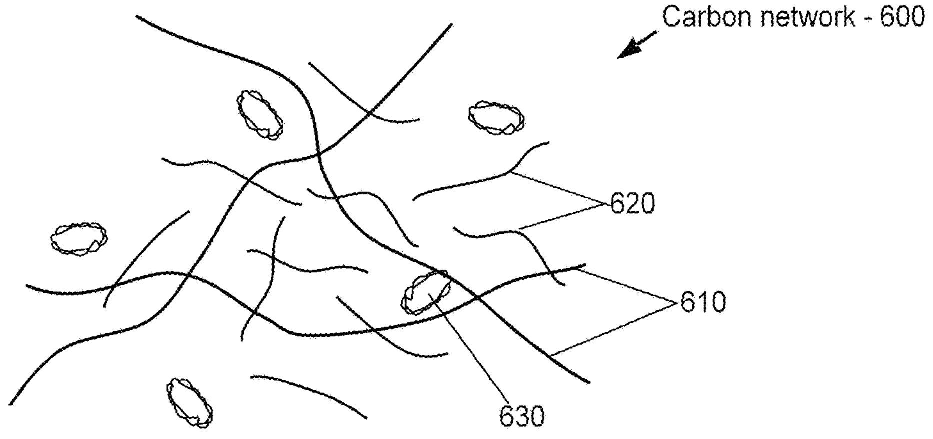
FIG. 6 is a schematic diagram depicting aspects of a carbon network as included in an anode according to various embodiments of the present application.

FIG. 6 is a schematic diagram depicting aspects of a carbon network as included in an anode according to various embodiments of the present application.

Referring to FIG. 6, a conceptual diagram illustrates components of the carbon network 600. Carbon network 600 of FIG. 6 may correspond to carbon network 510 of electrode 500 of FIG. 5. According to various embodiments, the carbon network 600 includes a plurality of high aspect ratio nanocarbons 610. In some embodiments, the high aspect ratio nanocarbons need not be uniform or substantially uniform. In this illustration, a series of long ("dominant," "major" or other terminology may be used as well) high aspect ratio nanocarbons collectively provide a scaffold 610 (or "framework") for the carbon network 600 and a series of short (also referred to as "minor" or other similar terminology may be used) high aspect ratio nanocarbons serve as ties 620 within the carbon network 610. Additionally, the carbon network 600 may include shaped carbon structures as couplers 630. Generally, the term "shaped carbon structures" refers to carbon additions that are not high aspect ratio nanocarbons. According to various embodiments, the couplers 630 enhance the integrity of the carbon network 610 as well as retention of the active materials.

According to various embodiments, the carbon network 600 may comprise carbon nanotubes (CNT). The carbon nanotubes (CNT) may be single walled (SWNT), multiwalled (MWNT) or some combination thereof. The carbon nanotubes (CNT) may be open-ended, capped or a combination thereof. In some embodiments, the average length of the carbon nanotubes (CNT) in the carbon network 600 may be at least 0.1 micrometers (μm), 0.5 micrometers (μm), 1 micrometers (μm), 5 micrometers (μm), 10 micrometers (μm), 50 micrometers (μm), 100 micrometers (μm), 200 micrometers (μm), 300, micrometers (μm), 400 micrometers (μm), 500 micrometers (μm), 600 micrometers (μm), 7000 micrometers (μm), 800 micrometers (μm), 900 micrometers (μm), 1,000 micrometers (μm) or more. For example, in some embodiments, the average length of the carbon nanotubes (CNT) may be in the range of 1 micrometer (μm) to 1,000 micrometers (μm), or any subrange thereof, such as 1 micrometer (μm) to 600 micrometers (μm). In some embodiments, more than fifty percent (50%), sixty percent (60%), seventy percent (70%), eighty percent (80%), ninety percent (90%), ninety five percent (95%), ninety nine percent (99%) or more of the carbon nanotubes (CNT) may have a length within ten percent of the average length (10%) of the carbon nanotubes (CNT) in the carbon network 600.

Other forms of carbon that may be used in the carbon network 600 to provide at least one of the scaffold 610 and the ties include carbon nanofiber (CNF), carbon microfiber (CMF), reduced graphene oxide (RG) and graphene oxide (GO). Generally, carbon nanofibers (CNFs) may include vapor grown carbon fibers (VGCFs), or vapor grown carbon nanofibers (VGCNFs) and are generally cylindrical nanostructures with graphene layers arranged as stacked cones, cups or plates. Carbon nanofibers with graphene layers wrapped into perfect cylinders are carbon nanotubes (CNT). Carbon microfibers (or simply, carbon fibers, which may also be referred to as graphite fiber) include fibers about of about 5 micrometers (μm) to 10 micrometers (μm) in diameter and composed mostly of carbon atoms. The carbon fibers may have diameters ranging from about 16 micrometers (μm) to 22 micrometers (μm).

Generally, the atomic structure of carbon fiber is similar to that of graphite, comprising sheets of carbon atoms arranged in a regular hexagonal pattern (graphene sheets), the difference being in the way these sheets interlock.

Depending upon the precursor to make the fiber, carbon fiber may be turbostratic or graphitic, or have a hybrid structure with both graphitic and turbostratic parts present. In turbostratic carbon fiber the sheets of carbon atoms are haphazardly folded, or crumpled, together. Carbon fibers derived from polyacrylonitrile (PAN) are turbostratic, whereas carbon fibers derived from mesophase pitch are graphitic after heat treatment at temperatures exceeding 2200° C. Turbostratic carbon fibers tend to have high tensile strength, whereas heat-treated mesophase-pitch-derived carbon fibers have high Young's modulus (i.e., high stiffness or resistance to extension under load) and high thermal conductivity.

In various embodiments, the shaped carbon structures can include carbon in a variety forms, including activated carbon, carbon black, graphite, and others. The shaped carbon structures can include carbon particles, including nanoparticles, such as nanotubes, nanorods, graphene in sheet, flake, or curved flake form, and/or formed into cones, rods, spheres (buckyballs) and the like.

Generally, the carbonaceous materials selected for the carbon network 600 have a surface that is at least partially "functionalized." For example, the carbonaceous materials used undergo surface functionalization using, for example, carboxylic (COOH) groups, amine ($NH_2$) groups, silane groups or other materials. Generally, the functionalized carbon materials have a covalent linkage to active material particles, e.g. amine linkage.

In some embodiments, the cathodes for lithium-ion batteries (LiB) may be fabricated with surfactants (a substance which tends to reduce the surface tension of a liquid in which it is dissolved). Examples of suitable surfactants include, without limitation: sodium dodecylbenzenesulfonate (SDBS), water soluble cationic solvents such as cetrimonium bromide (also known as cetyl trimethyl ammonium bromide or CTAB); cetyltrimethylammonium bromide, hexadecyltrimethylammonium bromide quaternary ammonium surfactants (such as cetyltrimethylammonium bromide, hexadecyltrimethylammonium bromide, $[(C_{16}H_{33})N(CH_3)_3]Br$), polysorbate 80, polysorbate 20 and/or other surfactants. In some embodiments, various thickeners and/or binders may be included. In some of these latter embodiments, further treatment such as pyrolysis may be used during finishing of the energy storage materials fabricated.

According to various embodiments, the combination of carbonaceous materials selected for the carbon network 600 correspond to (e.g., cause) a framework that includes scaffold 610, ties 620 and couplers 630 that result in entanglement and adhesion. That is, the carbon network 41 mimics the adhesion function of a polymer. By providing adhesion without a polymer and instead with highly conductive materials, the resulting electrode exhibits performance superior to embodiments found in the prior art.

An introduction to techniques for fabrication of an electrode such as electrode 500 of FIG. 5 is provided below.

Figure 7:
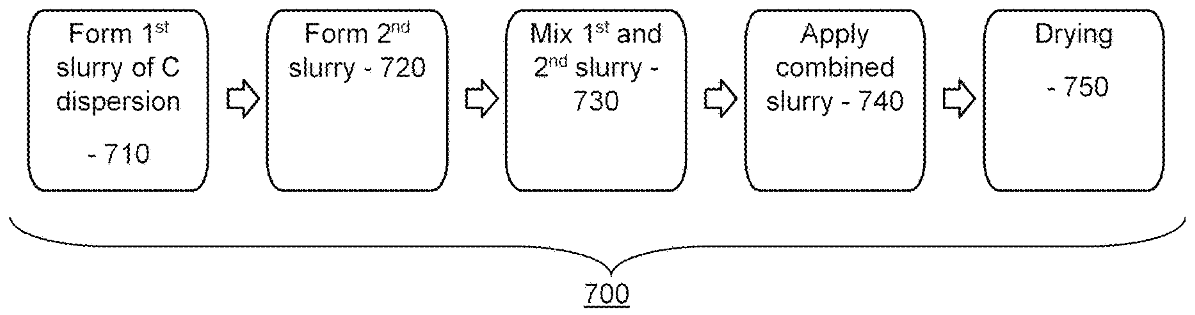
FIG. 7 is a flow chart of a method for fabricating an electrode according to various embodiments of the present application.

FIG. 7 is a flow chart of a method for fabricating an electrode according to various embodiments of the present application.

Referring to FIG. 7, process 700 may be implemented in connection with fabricating electrode 500 of FIG. 5, and/or ESD 400 of FIGS. 4A-4C.

In some embodiments of the process for fabricating an electrode such as electrode 500, at least one of the active layer (e.g., active layer 560) and the adhesion layer (e.g., adhesion layer 540) are formed from two solutions. It should be noted that while the process for mixing a slurry (described below) is similar for each layer, differing recipes may be used or needed for each of the respective layers.

At 710, a first solution is provided that includes a solvent and a quantity of carbonaceous materials. The carbonaceous materials may include materials suited for assembly of the carbon network such as carbon network 600 of FIG. 6. At 720, a second solution is provided that includes a solvent with carbonaceous material disposed therein. According to various embodiments, the carbonaceous material includes at least one form of material that is substantially composed of carbon. Exemplary forms of the carbon addition include, for example, at least one of activated carbon, carbon powder, carbon fibers, rayon, graphene, aerogel, nano-horns, carbon nanotubes (CNT), and the like. Although in some embodiments, the carbon addition is formed substantially of carbon, in alternative embodiments, the carbon addition may include at least some other materials (e.g., additives included by design).

In various embodiments a surfactant is mixed with the carbons and solvent. Such surfactant is selected to have hydrophobic interaction with the surface of the carbons. The hydrophilic head of the surfactants is also selected to generate a self-assembly process between carbons and other active materials.

In various embodiments PVP, PVA, PAN are added to the solvent.

In various embodiments, any suitable solvent may be used in at 710 and 720. Examples include, for example. ethanol, methanol, isopropyl alcohol, dimethyl sulfoxide, dimethylformamide, acetone, acetonitrile, and the like. According to various embodiments, choose a solvent that will be substantially eliminated in the drying step (e.g., 750) described below is advantageous. Techniques for elimination of the solvent include, for example, using heat and/or vacuum drying techniques.

Additional examples of solvent that may be used for making the slurry include the following and/or any suitable combinations thereof: cyclic aliphatic hydrocarbons such as cyclopentane and cyclohexane; aromatic hydrocarbons such as toluene, xylene, and ethylbenzene; ketones such as acetone, ethyl methyl ketone, diisopropyl ketone, cyclohexanone, methyl cyclohexane, and ethyl cyclohexane; chlorine-based aliphatic hydrocarbons such as methylene chloride, chloroform, and carbon tetrachloride; esters such as ethyl acetate, butyl acetate, γ-butyrolactone, and ε-caprolactone; acylonitriles such as acetonitrile and propionitrile; ethers such as tetrahydrofuran and ethylene glycol diethyl ether: alcohols such as methanol, ethanol, isopropanol, ethylene glycol, and ethylene glycol monomethyl ether; and amides such as N-methylpyrrolidone and N,N-dimethylformamide.

Further examples (alone or in suitable combinations) include, without limitation: one or more organic carbonates and/or other organic solvents. Exemplary organic solvents include: dimethyl carbonate, diethyl carbonate, ethylene carbonate, dipropyl carbonate, propylene carbonate, gamma-butyrolactone, tetrahydrofuran, dimethoxyethane (glyme), diglyme, triglyme and other glycol ethers, dimethoxysulfoxide, dioxolane, sulfolane and mixtures thereof. In some embodiments, the organic solvent is a mixture of dimethyl carbonate and ethylene carbonate or diethyl carbonate and ethylene carbonate. The organic solvents are characterized in that they only contain water in a small amount, such as about twenty (20) ppm or less. In this connection, although the organic solvents are non-aqueous, they do not have to be completely anhydrous as they may contain low levels of water contamination. However, anhydrous organic solvents may be used.

In some embodiment, electrolyte (E) may include a lithium salt dissolved in a solvent mixture. In some embodiments, the electrolyte (E) may include additives as described herein.

In some embodiments, the lithium salt may include a lithium cation paired with an anion. In some embodiments, the anion may be an organic anion which comprises a plurality of halogen functional groups, e.g. at least three, at least four, at least five, or at least six such groups. In some embodiments the halogen functional groups may be fluorine functional groups. In some embodiments, such an organic anion may be selected such that, during the operation of the energy storage device 10 the halogen functional groups require relatively high electrochemical activation energy to be liberated from the organic anion.

In some such embodiments, the organic cation performs advantageously during operation of the ESD. The multiple halogen groups providing an abundant source of desired halides (e.g., fluorine) during formation of the capacitor. These desired halide groups react beneficially with available lithium to create highly thermally and electrically stable compounds (e.g., lithium fluoride) increasing the stability of SEI layers formed (as used herein, a passivation layer is also referred to as the solid electrolyte interphase (SEI) layer). However, the relatively high activation energy required to liberate such halide groups from their base molecules can limit the occurrence of side chain reactions even at elevated temperatures.

In some embodiments, the organic anion may be a symmetric molecule centered about a nitrogen atom. In some embodiments, each chain extending from this central atom may include a sulfur containing group such a sulfonyl group (e.g., a sulfonyl halide).

For example, in some embodiments the salt may be lithium bis(trifluoromethanesulfonyl)imide (structural formula shown below):

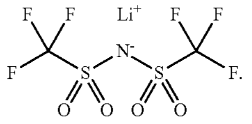 [SMILES: [Li+] ; O=S(=O)([N-]S(=O)(=O)C(F)(F)F)C(F)(F)F]

Note the presence of three fluorine atoms on each side of the molecule, for a total of six such groups. The fluorine atoms require a higher activation energy to be liberated from the cation than would be the case for similar salts such as lithium bis(fluorosulfonyl)imide (structural formula shown below):

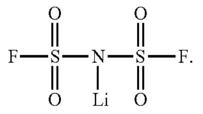

The solvent mixture may include a mixture of a plurality of solvent compounds. In some embodiments, a first solvent compound may be an organic solvent which contains no carbonate groups. For example, in some embodiments the first solvent compound may be butyl nitrite (structural formula shown below).

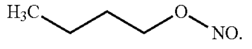

In some such embodiments, the lack of carbonate groups advantageously inhibits the formation of unwanted gases such as carbon dioxide during operation of the ESD (e.g., ESD 100 of FIG. 1, ESD 400 of FIG. 4, etc.). In some embodiments a first solvent compound may be stable against degradation at high temperatures (e.g. up to 65° C., 70° C., 75° C., 80° C., 85° C., 90° C., 95° C., or even 100° C.) at voltages in the range of 0V to 5V or any subrange thereof, such as 2.2 V to 3.8 V.

In some embodiments, the first solvent compound may be in the range of 60 vol % to 80 vol % of the solvent mixture, or in any subrange thereof such as 65%, 70%, 75%. For example, in some embodiments, the first solvent compound may be 72.5 vol % of the solvent mixture.

In some embodiments, a second solvent compound may be selected to improve the performance of the ESD at lower temperatures (e.g., less than −20° C., −30° C., −40° C., −50° C., −55° C., −60° C.). For example, in some embodiments, the second solvent compound may be selected to inhibit the formation of lithium dendrites during low temperature operation. In some embodiments, the second solvent compound may inhibit an increase in viscosity of the electrolyte (E) at lower temperatures. In some embodiments, the second solvent compound may be gamma-butyrolactone (structural formula below).

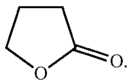

In some embodiments, the second solvent compound may be in the range of 0 vol % to 30 vol % of the solvent mixture, or in any subrange thereof. For example, in some embodiments, the second solvent compound may be 12.5 vol % of the solvent mixture.

In some embodiments, a third solvent compound may be selected to improve the formation of a passivating solid electrolyte interface (SEI) between the electrolyte (E) and one or both of the electrodes. In some embodiments, the third solvent compound may include a carbonate group, but may be selected such that the carbonate group is not easily liberated at activation energies present during the operation of the energy storage device 10. In some embodiments, the third solvent compound is selected such that a substantial fraction (e.g., greater than 10%, 20%, 30%, 40%, 50%, 60%, 70%, 80%, 90%, 99% or more) of the compound is expended during the formation of the SEI, thus limiting the presence of carbonate groups in the electrolyte E during the operational life of the energy storage device 10.

In some embodiments, the third solvent compound may be vinylene carbonate (structural formula below):

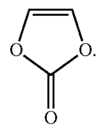

In some embodiments, the third solvent compound may be in the range of 5 vol % to 20 vol % of the solvent mixture, or in any subrange thereof. For example, in some embodiments, the third solvent compound may be 10 vol % of the solvent mixture.

In some embodiments, a fourth solvent compound may be selected to stabilize the lithium salt, e.g., by inhibiting decomposition at high temperatures. The fourth solvent compound may thereby improve the cycle life of the ESD. In some embodiments, the fourth solvent compound may be an organosilicon compound. In some embodiments the organosilicon compound may be selected from the list comprising of: [4-[fluoro(dimethyl)silyl] butanenitrile] and others.

In some embodiments, the fourth solvent compound may be in the range of 0 vol % to 5 vol % of the solvent mixture, or in any subrange thereof. For example, in some embodiments, the fourth solvent compound may be 1.5 vol % of the solvent mixture.

In some embodiments, the electrolyte (E) may contain one or more additives, for example, lithium bis(oxalato) borate (LiBOB), lithium difluoro(oxalate)borate (LiDFOB) compounds. Other suitable additives may include; lithium bis(trifluoromethanesulfonyl)imide (LiTFSI), lithium perchlorate (LiClO4), lithium hexafluorophosphate ($LiPF_6$), lithium tetrafluoroborate ($LiBF_4$), and combinations thereof. These additives may be used to increase high temperature stability.

In some embodiments, the one or more additives may be in the range of 0 wt % to 5 wt % of the solvent mixture, or in any subrange thereof. For example, in some embodiments, the one or more additives may be 0.1 wt % of the solvent mixture.

The concentration of the lithium salt is not specifically limited if it can maintain the electric conductivity of the electrolyte. The concentration of the lithium salt may be, for example, 0.1 to 2.5 mol/L, or any subrange thereof. In some embodiments, the concentration of the lithium salt may be, for example, 0.8 to 1.2 mol/L. In some embodiments, the concentration of the lithium salt may be, for example about 1.0 mol/L.

In some embodiments the a electrolyte E may be stable against degradation at high temperatures (e.g. up to 65° C., 70° C., 75° C., 80° C., 85° C., 90° C., 95° C., or even 100° C.) at voltages in the range of 0V to 5V or any subrange thereof, such as 2.2V to 3.8V.

FIG. 8 through FIG. 11 are diagrams depicting aspects of electrolyte useful for fabrication of an energy storage cell according to various embodiments of the present application.

Referring to FIG. 8, several non-limiting exemplary recipes for the electrolyte (E) are provided.

Referring to FIG. 9, exemplary performance characteristics for an ESD featuring an electrolyte (E) according to various embodiments, such as described above, and having at least one electrode formed using a binderless composite electrode of the type described in, for example, U.S. Pat. No. 10,600,582, entitled "Composite Electrode," issued on Mar. 24, 2020; U.S. Pat. No. 9,001,495, entitled "High power and high energy electrodes using carbon nanotubes," issued on Apr. 7, 2015 and also U.S. Pat. No. 9,218,917, entitled "Energy storage media for ultracapacitors," issued on Dec. 22, 2015, the entire disclosures of which are incorporated by reference herein. In some embodiments, the use of such binderless composite electrode is advantageous as it ensures no unwanted reactions between the electrolyte (E) and polymer binders of the types found in conventional electrodes.

Although the foregoing describes the use of the electrolyte (E) in a lithium ion capacitor, it will be readily apparent to one skilled in the art that is may also be used in lithium ion batteries, or even in electric double layer capacitors (e.g., by omitting the lithium salt).

Figure 10:
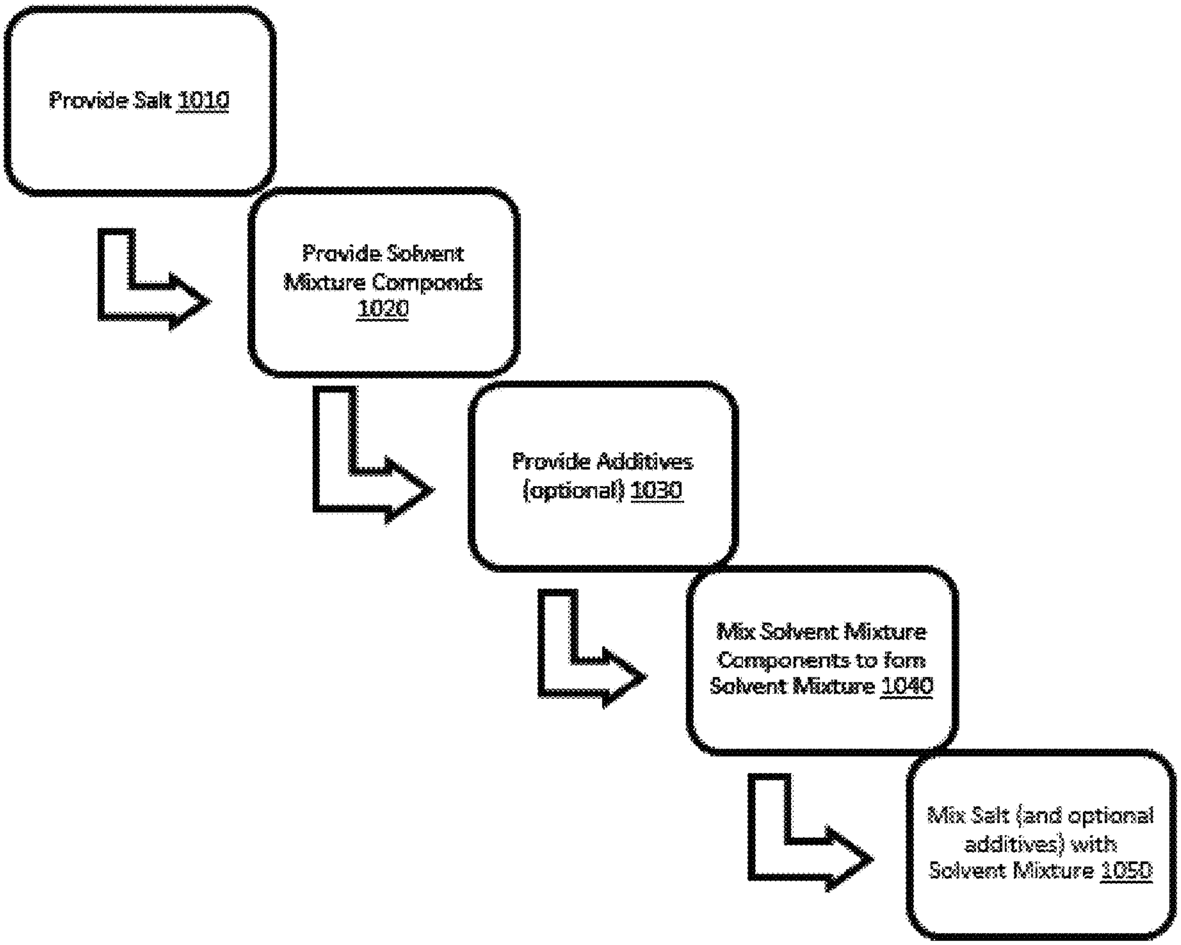

Referring to FIG. 10, a process for manufacturing an electrode (E) according to various embodiments is provided. The electrode may correspond to electrode 500 of FIG. 5.

At 1010, a salt is provided.

At 1020, a solvent mixture of compounds is provided.

At 1030, additives are provided. In some embodiments, 1030 is optional.

At 1040, solvent mixture of compounds is mixed to form a solvent mixture.

At 1050, the salt is mixed with the solvent mixture. In some embodiments, a salt and optional additives are mixed with the solvent mixture.

In some embodiments, ESD may be subjected to an initial formation or seasoning process. In the formation process, one or more of the electrodes in ESD may become doped with lithium. Further, a passivating SEI layer may be formed at the interface between one or more of the electrodes and the electrolyte (E).

Figure 11:
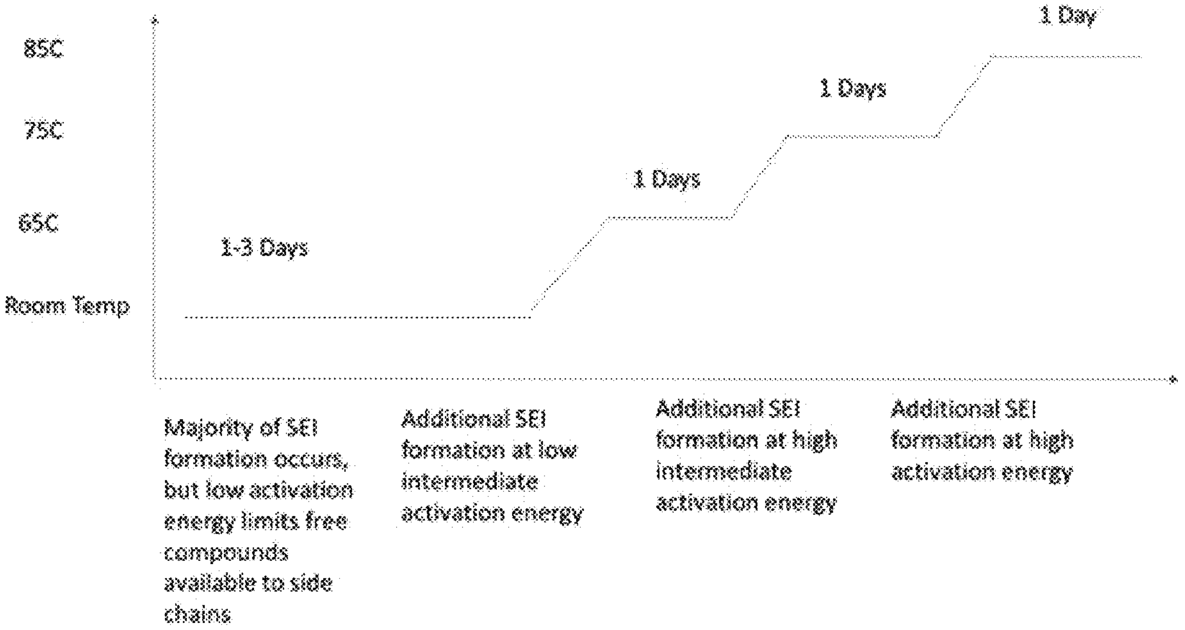

In some embodiments, ESD is charged to a desired voltage (e.g., the rated operational voltage) and kept at that voltage for periods of time at various temperature. FIG. 11 illustrates a non-limiting exemplary temperature ramp of this type, where the cell is kept at root temp for a first period (as shown, 1-3 days), and then at successively higher temperatures for subsequent periods (as show, 1 day at each higher temperature). Various other temperature ramps may be implemented.

In some embodiments, the formation process allows the consumption of certain compounds in the electrolyte E (e.g., carbonate compounds used in formation of the SEI layer) at low temperatures, thereby limiting the contribution of such compounds to unwanted gas generating side chain reactions at higher temperatures.

According to various embodiments, the techniques may be readily adapted to provide electrodes for various types of energy storage devices, including batteries (e.g., lithium ion batteries) and types of capacitors (e.g., lithium capacitors).

For example, and by way of non-limiting examples, cathodes may include: lithium cobalt oxide (LCO, sometimes called "lithium cobaltate" or "lithium cobaltite," is a chemical compound with one variant of possible formulations being $LiCoO_2$); lithium manganese cobalt oxide (NMC, with a variant formula of LiNiMnCo); lithium ion manganese oxide battery (LMO with variant formulas of $LiMn_2O_4$, $Li_2MnO_3$ and others); lithium nickel cobalt aluminum oxide ($LiNiCoAlO_2$ or NCA) and lithium titanate (LTO with one variant formula being $Li_4Ti_5O_{12}$); lithium iron phosphate (LFP, with one variant formula being $LiFePO_4$), and similar other materials. Other variants of the foregoing may be included. Anodes may include graphite, hard carbon, silicon, and other materials as active materials including silicon.

In some embodiments where NMC is used as an active material, nickel rich NMC may be used. For example, in some embodiments, the variant of NMC may be $LiNi_xMn_yCo_{1-x-y}$, where x is equal to or greater than about 0.7, 0.75, 0.80, 0.85, or more. In some embodiments, so called NMC811 may be used, where in the foregoing formula x is about 0.8 and y is about 0.1.

In some embodiments, the use of the carbon network may allow for the active layer of the electrode to be made substantially from active material e.g., greater than 75%, 80%, 85%, 90%, 95%, 99%, 99.5%, 99.8% or more by weight, while still exhibiting excellent mechanical properties (e.g., lack of delamination during operation in an energy storage device of the types described herein). For example, in some embodiments, the active layer may have such aforementioned high amount of active material and a large thickness (e.g., greater than 50 μm, 100 μm, 150 μm, 200 μm, or more), while still exhibiting excellent mechanical properties (e.g., a lack of delamination during operation in an energy storage device of the types described herein).

In some embodiments, the use of the carbon network provides for excellent transport of lithium ions into and out of the active layer during the charging and discharging of an energy storage device.

The processes disclosed herein allow for ultra-thick three-dimensional (3D) electrodes (>100 μm) while keeping good power capabilities. Advantageously, in some embodiments, there is no need to use NMP solvent and a fast drying process results that contributes to a rapid fabrication. For example, the binder-free slurry preparation yields a very fast process, on the order of about 10 minutes. Roll-to-roll coating may make use of volatile solvents thus providing for fast coating and drying. After calendaring (as appropriate), the absence of polymeric binder material allows for high temperature baking (e.g., greater than 200 degrees Celsius) and thus the moisture removal process can be shortened from a typical 8-12 hours to two hours or less.

Figures 12, 13:
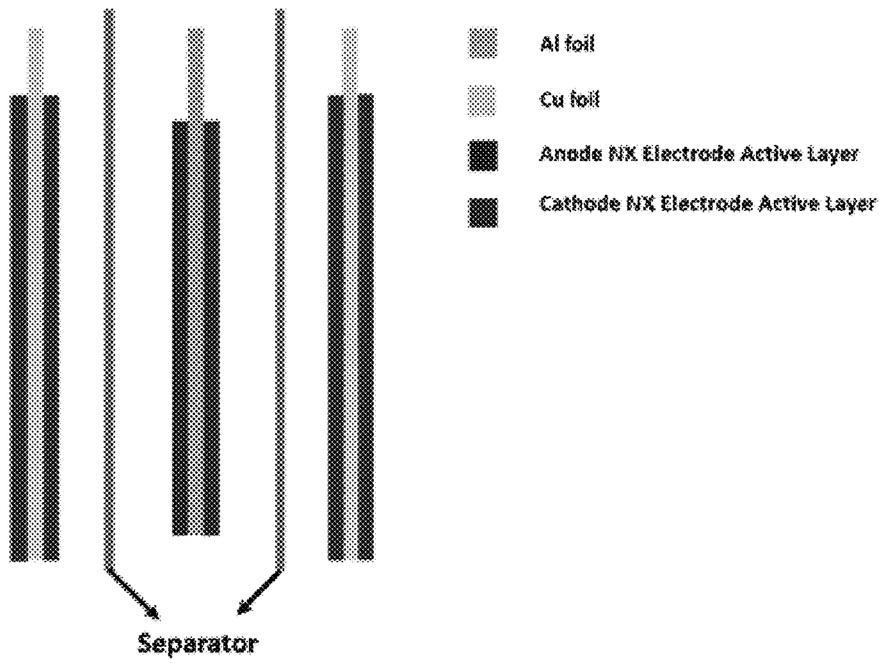

An exemplary embodiment of the energy storage device was constructed and tested. FIG. 12 depicts arrangement of electrodes within the energy storage device. FIGS. 13-16 provide information pertaining to the energy storage device of FIG. 12. In this example, the cathode included a double-side coated NMC811 active layer. Mass loading was 28.1 $mg/cm^2$ per side. Press density was 3.3-3.4 $g/cm^3$. The thickness of the active layer was 85.2 μm per side. The anode was double-sided, coated with 30% $SiO_x$ active material (e.g., by weight). Mass loading was 8.9 $mg/cm^2$ per side. Press density was 1.5 $g/cm^3$. Thickness of the active layer was 59.6 μm per side. The N/P ratio was approximately 1.2. The separator was Celgard 20 μm polypropylene (PP) based with a 4 μm ceramic coating on one side. The electrolyte was a high performance $SiO_x$ anode based Li-ion battery electrolyte. As depicted in FIG. 12, the energy storage device was constructed with a three layer cell design having a cell size: 50×50 mm. The cathode included aluminum foil with a thickness of about 12-15 μm. The anode included copper foil with a thickness of about 8-10 μm. The 2 Ah cell includes seven layers of cathode and eight layers of anode with a pouch cell size of 65×55 mm. The NX3D carbon may correspond to an advanced 3-D nanoscopic carbon binding structure, such as the active of layer 560 of electrode 500 of FIG. 5, and/or carbon network 600 of FIG. 6. Formulation indicated in FIGS. 14 and 15 may correspond to weight percent.

As used herein the symbol "wt %" means weight percent. For example, when referring to the weight percent of a solute in a solvent, "wt %" refers to the percentage of the overall mass of the solute and solvent mixture made up by the solute.

The entire contents of each of the publications and patent applications mentioned above are incorporate herein by reference. In the event that the any of the cited documents conflicts with the present disclosure, the present disclosure shall control.

Various other components may be included and called upon for providing for aspects of the teachings herein. For example, additional materials, combinations of materials and/or omission of materials may be used to provide for added embodiments that are within the scope of the teachings herein. A variety of modifications of the teachings herein may be realized. Generally, modifications may be designed according to the needs of a user, designer, manufacturer or other similarly interested party. The modifications may be intended to meet a particular standard of performance considered important by that party.

The appended claims or claim elements should not be construed to invoke 35 U.S.C. § 112(f) unless the words "means for" or "step for" are explicitly used in the particular claim.

When introducing elements of the present invention or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements. As used herein, the term "exemplary" is not intended to imply a superlative example. Rather, "exemplary" refers to an example of an embodiment that is one of many possible embodiments.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A vehicle, comprising:

a drivetrain configured to provide the vehicle with propulsion;

a controller configured to obtain power from an energy source and to provide the drivetrain with power, wherein the controller regulates an amount of power provided to the drivetrain; and an energy storage device that provides power to the controller, the energy storage device comprising:

a housing comprising:

a substantially binder free anode comprising a current collector comprising anode active material dispersed in a carbon network disposed thereon, the anode active material comprising silicon oxide material;

a substantially binder free cathode comprising a current collector comprising cathode active material dispersed in a carbon network disposed thereon, the cathode active material comprising nickel-rich layered oxide $N_xM_yC_{1-x-y}$, where x≥0.7 and y≥0.1 material;

a separator disposed between the anode and the cathode; and an electrolyte wetting the anode, cathode, and separator, wherein the electrolyte comprises a lithium salt dissolved in a solvent mixture, the solvent mixture comprising 60-80 vol % of butyl nitrite; and wherein the cathode comprises a surface treatment and the surface treatment comprises at least one of cetyl trimethyl ammonium bromide ($[(C_{16}H_{33})N(CH_3)_3]Br$), hexadecyltrimethylammonium, hexadecyltrimethylammonium bromide, polysorbate 80 and polysorbate 20.

2. The vehicle of claim 1, further comprising a user interface that provides information pertaining to a status of one or more of (i) a module of the vehicle, and (ii) the vehicle in relation to an environment.

3. The vehicle of claim 1, wherein the vehicle is one or more of an automobile, a scooter, a motorcycle, a bike, a watercraft, and a drone.

4. The vehicle of claim 1, wherein the cathode of the energy storage device is free of N-Methyl Pyrrolidone (NMP).

5. The vehicle of claim 1, wherein:

the energy storage device comprises the anode; and the anode comprises silicon oxide.

6. The vehicle of claim 1, wherein:

the energy storage device comprises the cathode;

the cathode comprises the current conductor, an adhesion layer, and an active layer; and the adhesion layer causes the active layer to adhere to the current conductor.

7. The vehicle of claim 6, wherein:

the active layer comprises a quantity of high aspect ratio carbon, and the active material disposed within the quantity of high aspect ratio carbon.

8. The vehicle of claim 6, wherein the cathode comprises high aspect ratio carbon and active material, and an entanglement of the active material within the high aspect ratio carbon causes the active material to adhere to the cathode.

9. The vehicle of claim 8, wherein the high aspect ratio carbon comprised in the cathode comprises the carbon network, and the carbon network comprises a set of longer high aspect ratio nanocarbons, and a set of shorter high aspect ratio nanocarbons.

10. The vehicle of claim 9, wherein the set of longer high aspect ratio nanocarbons provides a scaffold for the carbon network, and the set of shorter high aspect ratio nanocarbons provides ties within the carbon network.

11. The vehicle of claim 8, wherein:

the high aspect ratio carbon comprised in the cathode comprises a carbon network; and the carbon network is at least ninety nine percent carbon by weight.

12. The vehicle of claim 8, wherein the cathode of the energy storage device is configured to have a ratio of an amount of discharge on a first discharge to an amount of charge on a first charge that is at least ninety-two percent.

13. The vehicle of claim 8, wherein an anode of the energy storage device is configured to have a ratio of an amount of discharge on a first discharge to an amount of charge on a first charge that is at least ninety-one percent.

14. The vehicle of claim 1, wherein the energy storage device comprises:

the current collector; upon which is disposed an electrode active layer; the electrode active layer comprising:

a network of high aspect ratio carbon elements defining void spaces therein;

a plurality of electrode active material particles disposed in the void spaces within the network and enmeshed in the network; and a surface treatment on a surface of the high aspect ratio carbon elements which promotes adhesion between the high aspect ratio carbon elements and the active material particles; wherein the surface treatment material comprises a surfactant.

15. The vehicle of claim 14, wherein the active material particles comprise lithium metal oxides.

* * * * *